(12) United States Patent
Huang et al.

(10) Patent No.: US 7,206,472 B2
(45) Date of Patent: Apr. 17, 2007

(54) OPTICAL BACKPLANES WITH INTEGRATED OPTICAL COUPLERS AND METHODS OF MAKING THE SAME

(75) Inventors: Lidu Huang, Danville, CA (US); Kishio Yokouchi, Tokyo (JP)

(73) Assignee: Fujitsu Ltd., Kawasaki (JP)

( * ) Notice: Subject to any disclaimer, the term of this patent is extended or adjusted under 35 U.S.C. 154(b) by 0 days.

(21) Appl. No.: 11/080,042

(22) Filed: Mar. 15, 2005

(65) Prior Publication Data
US 2006/0210213 A1    Sep. 21, 2006

(51) Int. Cl.
*G02B 6/12* (2006.01)
*G02B 6/124* (2006.01)
*G02B 6/32* (2006.01)
*G02B 6/34* (2006.01)

(52) U.S. Cl. .......................... 385/14; 385/33; 385/37; 385/50; 385/129

(58) Field of Classification Search ............... None
See application file for complete search history.

(56) References Cited

U.S. PATENT DOCUMENTS

| | | | | |
|---|---|---|---|---|
| 5,416,861 | A | * | 5/1995 | Koh et al. ................. 385/14 |
| 5,764,832 | A | * | 6/1998 | Tabuchi ..................... 385/49 |
| 6,690,845 | B1 | * | 2/2004 | Yoshimura et al. ......... 385/14 |
| 6,996,303 | B2 | * | 2/2006 | Glebov et al. ............. 385/14 |
| 7,065,271 | B2 | * | 6/2006 | Zheng et al. .............. 385/37 |

* cited by examiner

*Primary Examiner*—Rodney Bovernick
*Assistant Examiner*—Omar Rojas
(74) *Attorney, Agent, or Firm*—Sheppard Mullin Richter & Hampton LLP (57) ABSTRACT

Optical backplanes providing integrated optical couplers to external optical fibers are disclosed, along with methods for making the same. An exemplary optical backplane has a first cladding layer disposed over the top surface of a substrate, and at least a first core body disposed over the first cladding layer, with the first core body having a first end and a second end. A material layer is disposed above the first cladding layer and the first end of the first core body, with the material layer having a top surface and a bottom surface. A focusing element is formed at the top surface of the material layer, with the focusing element being located above the first end of the first core body.

37 Claims, 6 Drawing Sheets

OPTICAL BACKPLANES WITH INTEGRATED OPTICAL COUPLERS AND METHODS OF MAKING THE SAME

FIELD OF THE INVENTION

The present invention relates to optical systems for computing and networking applications, and more particularly to optical backplanes for such systems.

BACKGROUND OF THE INVENTION

Today, there is a drive to replace more of the electrical interconnections in computer and networking systems with optical interconnections in order to increase computation speed and communication bandwidth. These systems typically comprise a plurality of daughterboards that are interconnected to one another by a common optical backplane. Each daughterboard has a plurality of electrical pins or tabs disposed at one of its edges, which mate with corresponding electrical receptacles on the common optical backplane. The optical connections are generally accomplished by an optical ribbon connector that runs between the daughterboard and the optical backplane. One end of the optical ribbon connector is typically anchored to the daughterboard, while the other end has an optical connector that interlocks with an optical receptacle that is anchored to the optical backplane. Light is transmitted into the optical fibers by one or more arrays of vertical-cavity surface-emitting laser (VCSEL) diodes located on respective daughterboards, and light is received from the optical fibers by one or more arrays of conventional photodetectors located on respective daughterboards. The optical fibers are typically multimode fibers (i.e., fibers that transport light having multiple spatial modes).

One problem with the optical ribbon connector method has been the loss of light at the connection. The loss generally occurs when the light traverses the gap between the optical fiber of the ribbon and a corresponding optical fiber of the receptacle. The light exits the end of the optical fiber going in a plurality of different directions, and some of the light is not collected into the end of the opposing optical fiber because the gap does not have a waveguiding structure. Light is also lost because of misalignment between the ends of the optical fibers. One solution to this problem has been to place a prefabricated microlens adjacent to each fiber end in the receptacle to better collect the light emitted from the ribbon fiber, and to focus it on the fiber end in the receptacle. These microlenses also focus light exiting the receptacle fiber so that the light does not stray as it passes through the gap. Alternatively, these microlenses have been placed at the ends of the ribbon fibers. Both of these approaches, however, suffer from misalignment problems, which result in loss of light. In addition, both of these approaches require expensive and time-consuming micro-alignment procedures to place the microlenses in their optimal locations.

Accordingly, efficient coupling of light from ribbon optical fibers to the receptacle optical fibers has not been fully achieved.

SUMMARY OF THE INVENTION

Broadly stated, the present invention encompasses optical backplanes having focusing elements formed at or near the top surface of the optical backplane, and aligned with the ends of respective core bodies of the backplane's waveguides. The present invention eliminates the need for any optical fibers in the optical receptacle, and also eliminates the need for microlenses in either the optical receptacle or the optical ribbon connector (although microlenses may optionally be used in the optical ribbon connectors in some embodiments of the present invention). The present invention also encompasses methods for making optical backplanes with integrated optical couplers.

A first exemplary embodiment according to the present invention comprises a substrate having a top surface and a bottom surface, a first cladding layer disposed over the top surface of the substrate, and a first core body having a first end and a second end, with at least a portion of the first core body being in contact with the first cladding layer. The exemplary embodiment further comprises a material layer disposed above the first cladding layer and the first end of the first core body, with the material layer having a top surface and a bottom surface, and a focusing element formed at the top surface of the material layer, with the focusing element being located above the first end of the first core body.

In preferred embodiments, an angle-reflecting structure is formed at the first end of the core body to direct light in and out of the core body from an external optical fiber disposed above the material layer, by way of the first focusing element. Preferred embodiments further include a receptacle having a slot for receiving a ribbon fiber connector, or the like, having at least one optical fiber. The receptacle is mounted to the substrate above the material layer, such that the slot is located over the focusing element. The at least one optical fiber of the ribbon fiber connector (or the like) comprises a central fiber core, and the receptacle is aligned such that the central fiber core is centered over the focusing element. Alignment marks for use in mounting the receptacle are preferably formed on one or more of the following elements: the substrate, the first cladding layer, the material layer, or an additional layer. The alignment marks are set at known distances from the first end of the core body so that the receptacle can be placed to provide the desired alignment between the central fiber core and the focusing element.

A first exemplary method of forming an optical backplane according to the present invention comprises forming at least a first waveguide layer, with the first waveguide layer having at least a first cladding layer and at least a first core body, and with the first core body having a first end, a second end, and at least a portion in contact with the first cladding layer. The exemplary method further comprises forming a material layer above the first waveguide layer, the material layer having a top surface and a bottom surface, with the bottom surface facing the first waveguide layer. The exemplary method further comprises forming a focusing element at the top surface of the material layer, with the focusing element being located above the first end of the first core body. Preferred implementations of the first exemplary method further include forming at least one alignment mark on the substrate, or on one or more of the layers disposed above the substrate, or on both the substrate and one or more of the layers. Preferred implementations of the first exemplary method further comprise mounting a receptacle to the backplane, with the receptacle being aligned to at least one of the one or more alignment marks as part of the mounting process.

In this manner, the focusing element can be precisely aligned to the end of the first core body to provide good optical coupling between the end of the first core body and an external optical fiber.

Accordingly, it is an object of the present invention to increase the coupling efficiency of optical connectors and the like.

It is another object of the present invention to enable such increases in coupling efficiency without the need for expensive and time-consuming micro-alignment procedures.

These and other objects of the present invention will become apparent to one of ordinary skill in the art in view of the figures, the present specification, and the appended claims.

DETAILED DESCRIPTION OF THE INVENTION

Figure 1:
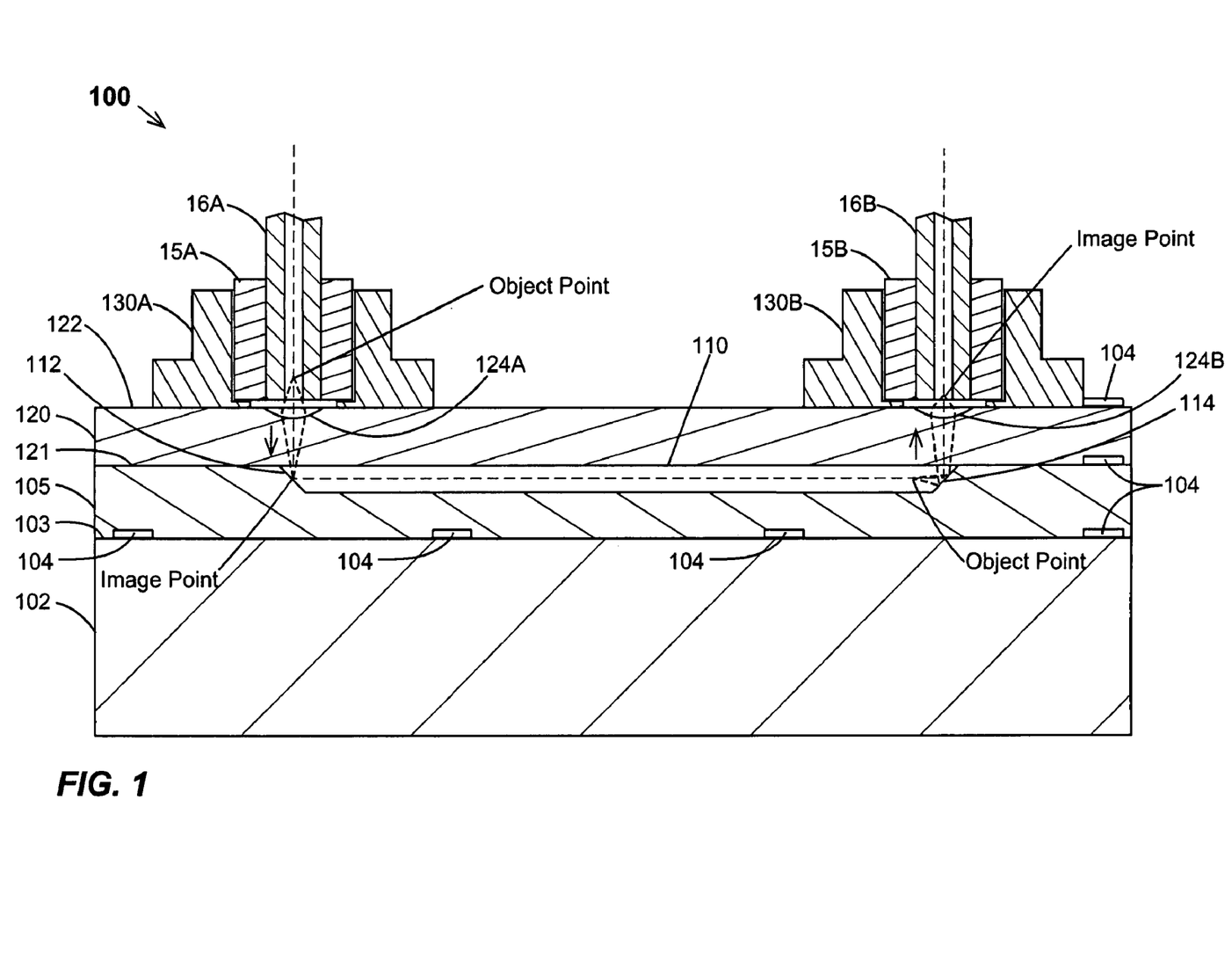
FIG. 1 shows a first embodiment of an optical backplane according to the present invention.

FIG. 1 shows a first embodiment 100 of an optical backplane according to the present invention, where the optical backplane may be used to provide optical interconnections among a plurality of daughterboards. Optical backplane 100 comprises a substrate 102 that has a top surface 103, a lower cladding layer 105 disposed over top surface 103 of substrate 102, and at least a first core body 110 formed over lower cladding layer 105, and a material layer 120 disposed above first cladding layer 105 and first core body 110. Material layer 120 has a top surface 122 and a bottom surface 121, and typically has a refractive index that is less than the refractive index of first core body 110, and also serves as an upper cladding layer. A waveguiding structure is thereby formed, with light being guided along core body 110, being confined by the lower refractive index of layers 105 and 120. It may be appreciated that an upper cladding layer may be disposed between first core body 110 and material layer 120, in which case the refractive index of material layer 120 need not be less than that of core body 110.

Core body 110 has a first end 112 and a second end 114, and has an elongated body that is generally disposed parallel to top surface 103 of substrate 102. Angle-reflecting structures are formed at each of ends 112 and 114 to direct light from external optical fibers into core body 110, and/or to direct light from core body 110 into external optical fibers. Each angle-reflecting structure may comprise a 45° mirror (relative to the optical propagation axis of core body 110), a grating structure with alternating layers of different refractive index, each layer tilted at 45° (relative to the optical propagation axis of core body 110), or other known angle-reflecting structures. Each angle-reflecting structure can receive light propagating in core body 110 and change its propagation direction by 90° (relative to the optical propagation axis of core body 110) so that it propagates through material layer 120 and exits top surface 122 substantially perpendicular thereto. Each angle-reflecting structure can also receive light directed perpendicular to the top surface 122 of material layer 120, and change its propagation direction by 90° so that it propagates in core body 110, substantially parallel to top surface 103.

Optical backplane 100 further comprises focusing elements 124A and 124B formed at the top surface 122 of material layer 120 at locations where light enters or exits the ends 112 and 114 of core body 110. Focusing elements 124A and 124B are located above ends 112 and 114. As described in greater detail below, each focusing element may comprise a lens, a grating structure, or other known focusing structure.

Optical backplane 100 further comprises a receptacle 130A mounted to substrate 102 at or above material layer 120. Receptacle 130A has a slot to receive a ribbon fiber connector 15A from a daughterboard, with the ribbon fiber connector 15A holding one or more optical fibers 16A, and with each optical fiber 16A having a central fiber core surrounded by cladding material. Receptacle 130A is disposed such that its slot is located above focusing element 124A and core-body end 112, and such that the central fiber core of optical waveguide 16A is disposed above element 124A and core-body end 112.

Optical backplane 100 further comprises additional receptacles similar to receptacle 130A for other daughterboards, one of which is shown as receptacle 130B. Receptacle 130B has a slot to receive a ribbon fiber connector 15B from a daughterboard, with the ribbon fiber connector 15B holding one or more optical fibers 16B, each having a central fiber core surrounded by cladding material. Receptacle 130B is disposed such that its slot is located above focusing element 124B and core-body end 114, and such that the central fiber core of optical waveguide 16B is disposed above element 124B and core-body end 114.

Alignment marks 104 are constructed during the fabrication of optical backplane 100 to facilitate the alignment of focusing elements 124A and 124B to ends 112 and 114, respectively, during the fabrication process, and further facilitate the alignment of receptacles 130A and 130B to focusing elements 124A and 124B (and to ends 112 and 114), respectively, during the mounting of receptacles 130A and 130B onto optical backplane 100. The alignment marks are preferably formed on the substrate's top surface 103, and are set at known distances from end 112 and 114 of core body 110 so that receptacles 130A and 130B can be placed to facilitate alignment of the central fiber cores and focusing elements 124A and 124B. The alignment marks may comprise deposited material (such as metal) or depressions etched in top surface 103, and are visible from the top surface 122 of material layer 120 since layers 105 and 120 are substantially transparent. Alignment marks 104 may also be used to align the photolithographic masks used to form core bodies 110 and focusing elements 124 so that the focusing elements are formed directly above respective ends of the core bodies 110. Also, other alignment marks may be used for this purpose. Alignment marks 104 can also be formed on the top surface of lower cladding layer 105, or on an additional layer located below layer 105, or located between layers 105 and 120. Alignment marks 104 can also be formed on top surface 122 of material layer 120 (as referenced by other alignment marks formed on one or more underlying layers), or on an additional layer located above layer 120. However, alignment marks formed on top surface 122 of material layer 120 would not be useful in aligning focusing elements 124 to respective ends of core bodies 110. The various possible positions of alignment marks 104 are shown at the right side of optical backplane 100 (FIG. 1). The alignment marks 104 may, of course, be stacked over one another on various layers.

Each of focusing elements 124A,B (including lenses and gratings described herein) preferably has a diameter that is equal to or greater than the diameter of the central fiber core located above it, and that is equal to or greater than 80% of the thickness of optical fiber 16A,B located above it. In preferred embodiments, each focusing element 124A,B has a diameter that is equal to or greater than twice the diameter of the central fiber core located above it, and more preferably greater than three times the diameter of the central fiber core located above it. The diameter of each focusing element 124A,B is typically less than four times the diameter of the central fiber core located above it. Thus, for a central fiber core with a diameter of 10 μm or less (single-mode fiber), the diameter of the focusing element would generally range from 10 μm to 40 μm, would preferably range from 20 μm to 40 μm, and would more preferably range from 30 μm to 40 μm. For a central fiber core with a diameter of 62.5 μm, the diameter of the focusing element would generally range from 62 μm to 250 μm, would preferably range from 125 μm to 250 μm, and would more preferably range from 187 μm to 250 μm.

In the implementation shown FIG. 1, the focusing elements comprise lenses formed into the top surface 122 of material layer 120. The material of the lenses has a refractive index that is different from that of material layer 120. In typical embodiments, the lens of a focusing element 124 has a refractive index that is greater than that of material layer 120, and has a plano-convex shape, meaning that it is thicker at the center of the lens than at the perimeter. The lens of a focusing element 124 may also have a refractive index that is less than that of material layer 122, in which case the lens may have a plano-concave shape, meaning that it is thinner at the center of the lens than at the perimeter. Given the magnitude of the difference between the indices of refraction, and the desired focal length of the lens, it is well within the ordinary skill of a person in the art to select the curvature value for the lens.

In the example shown in FIG. 1, optic fiber 16A directs light into end 112 of core body 110, and optic fiber 16B receives light from end 114 of core body 110. As to coupling light from optic fiber 16A, the light emitting from the end of the fiber has an effective object point that is inset approximately 20 μm to 200 μm from the end of the central fiber core, as indicated in the figure. The amount of inset can be computed from well-known formulas for optic fibers. The distance from the center of the lens of element 124A to the object point is designated herein as $D_O$, and can be computed as the inset distance, plus half the maximum thickness of the lens, plus the air-gap distance (as corrected for the difference between the refractive indices of air and material layer 120). To provide effective coupling, the corresponding image point on the opposite side of the lens should be located at the center of the angle-reflecting structure at end 112. The distance from the center of the lens of element 124A to the image point is designated herein as $D_I$, and can be computed as the thickness of material layer 120, plus half the thickness of core body 110, minus half the maximum thickness of the lens. One may use the well-known lens-maker equation, as given below, to approximate the focal length (f) needed to map the effective object point to the desired image point.

$$(1/f) = (1/D_O) + (1/D_I)$$

A more accurate selection of the focal length can be achieved with commercially available optics-simulation software.

As to coupling light to optic fiber 16B, the light emitted from end 114 of core body 110 has an effective object point that is inset approximately 10 μm to 50 μm from the end of the central fiber core, as indicated in the figure. The amount of inset can be computed from well-known formulas for optic fibers. The distance from the center of the lens of element 124B to the object point is designated herein as $D_O$, and can be computed as the inset distance, plus the thickness of material layer 120, plus half the thickness of core body 110, minus half the maximum thickness of the lens. To provide effective coupling, the corresponding image point on the opposite side of the lens should be located at the end face of the central fiber core of optic fiber 16B. The distance from the center of the lens of element 124B to the image point is designated herein as $D_I$, and can be computed as half the maximum thickness of the lens, plus the air-gap distance (as corrected for the difference between the refractive indices of air and material layer 120). With the desired values of $D_O$ and $D_I$ determined, an appropriate focal length can be selected, as aided by the previously described approaches.

Figure 2:
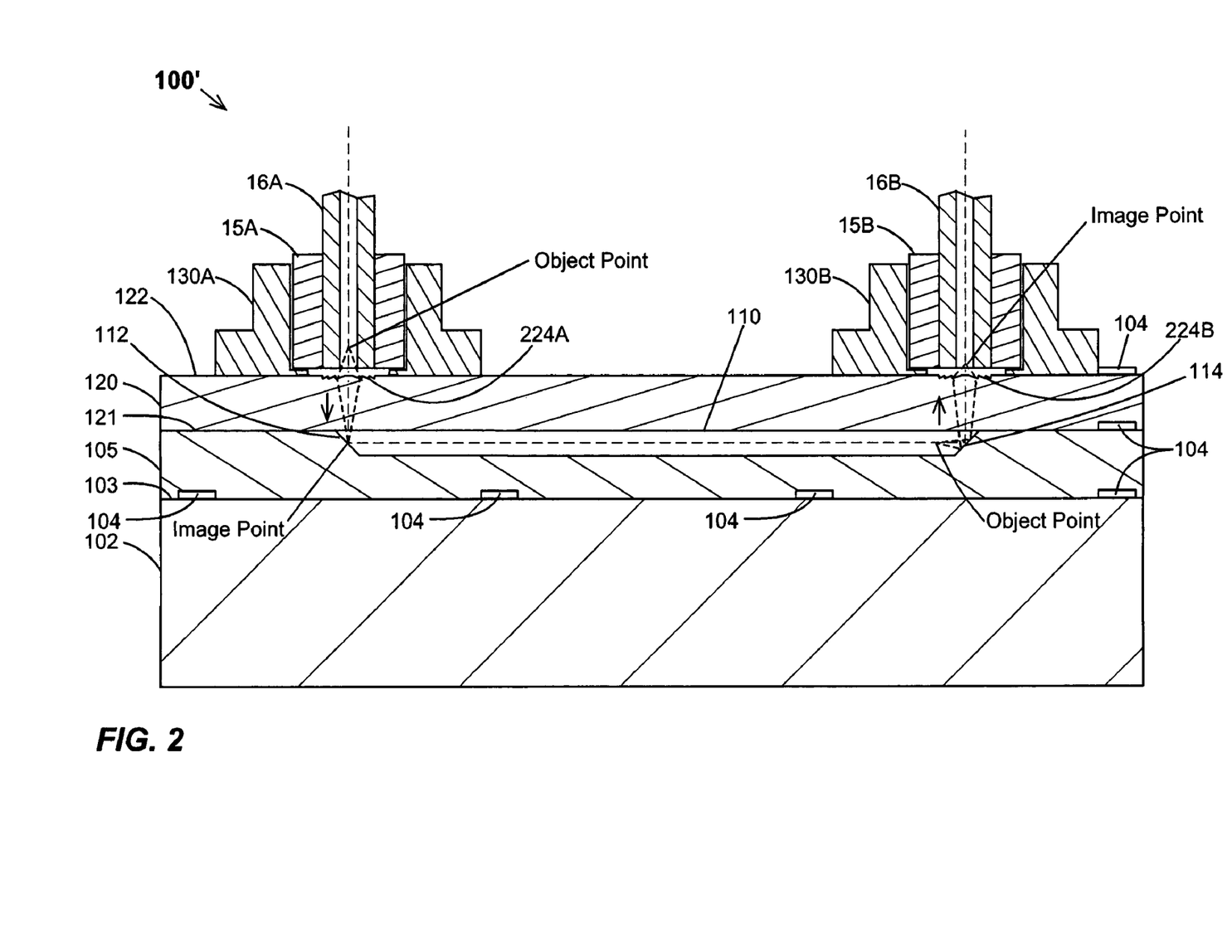
FIG. 2 shows a second embodiment of an optical backplane according to the present invention.
Figure 3:
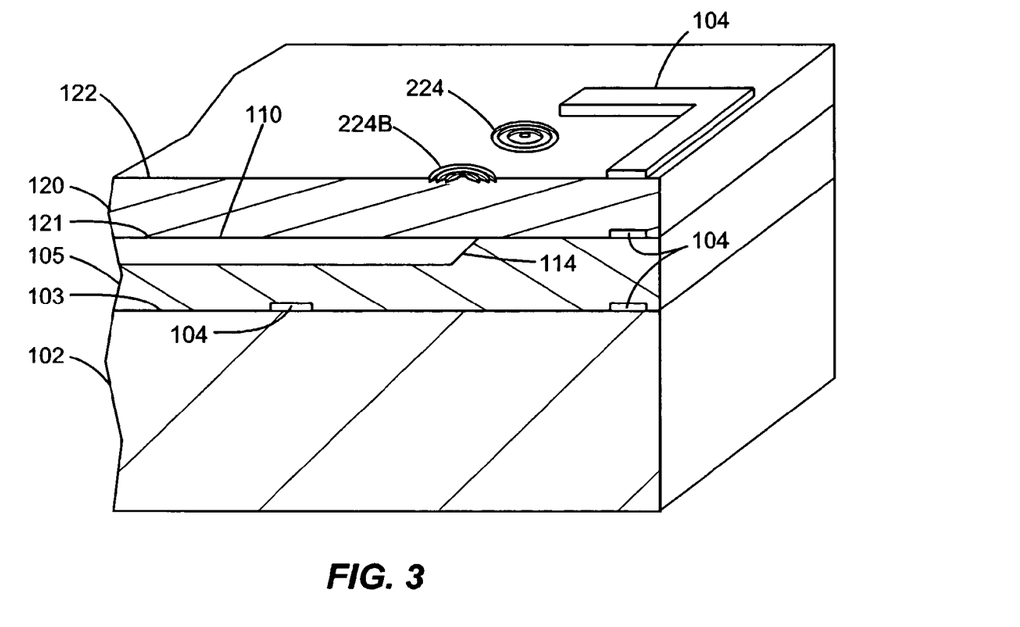
FIG. 3 shows a partial perspective view of the embodiment of FIG. 2 according to the present invention.

In the exemplary implementation shown in FIG. 1, the focusing elements 124 comprise lenses. In general, the focusing elements 124 may comprise any known focusing structure. FIG. 2 shows a second exemplary embodiment 100' of the present invention in which the focusing elements comprise gratings, such as those used in Fresnel lenses, as shown by elements 224A and 224B. Other than elements 224A and 224B, the elements shown in FIG. 2 having the same reference numbers as those shown in FIG. 1 are the same, and have the same purpose, attributes, and properties as described above. FIG. 3 shows a perspective view of grating 224B.

Figure 4:
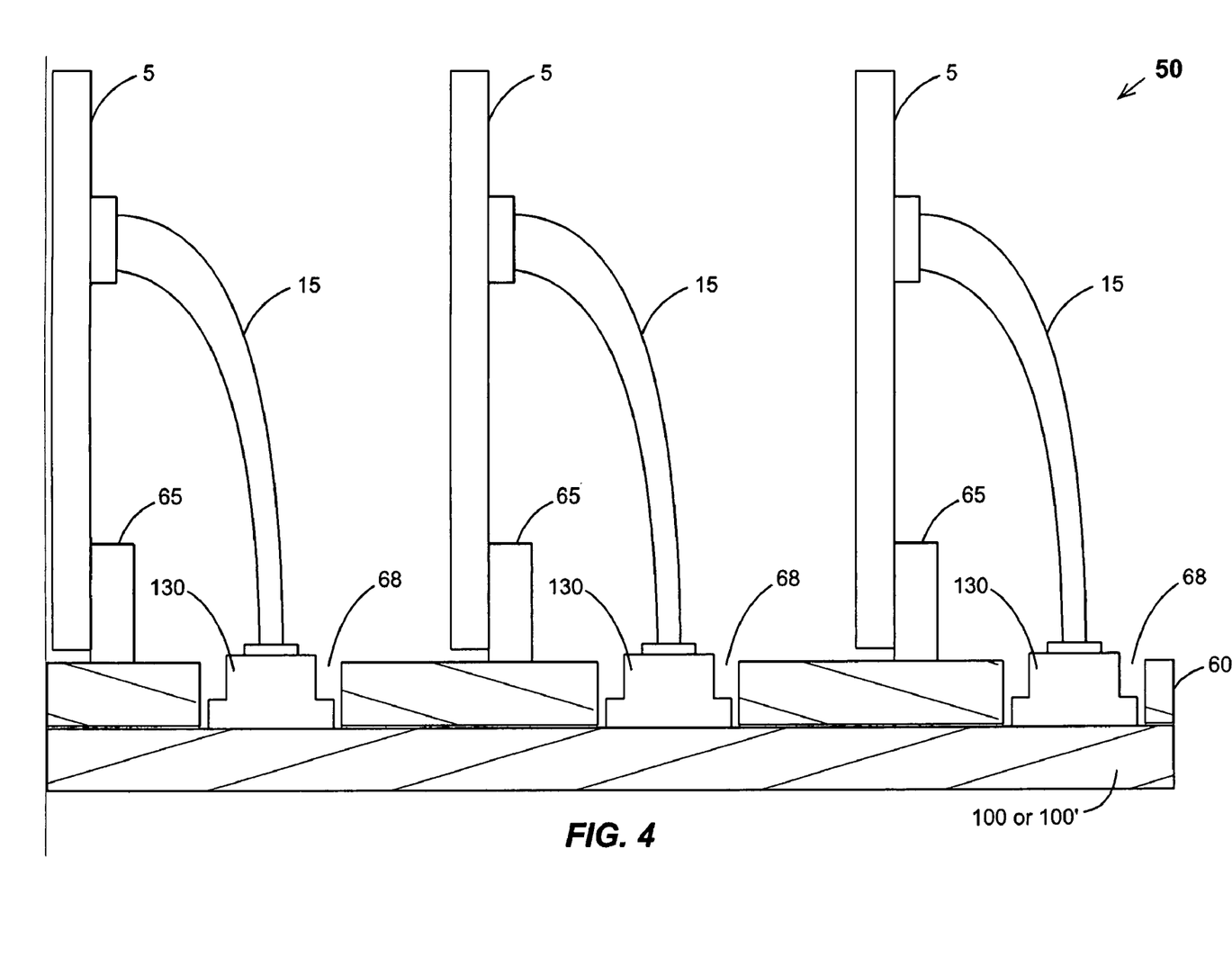
FIG. 4 is a side view of an exemplary application in which an optical backplane according to the present invention may be incorporated.

FIG. 4 shows an exemplary way that optical backplane 100 may be incorporated into a system 50. System 50 has a major electrical wiring board 60 that holds a plurality of daughterboards 5 at its front side, and provides electrical connections 65 to each of the daughterboards 5. Each daughterboard 5 has at least one ribbon fiber connector 15. Optical backplane 100 is mounted at the back side of wiring board 60. Wiring board 60 has a plurality of apertures 68 corresponding to the locations of receptacles 130, a construction which allows the receptacles to be accessible via the front side of wiring board 60.

Figure 5:
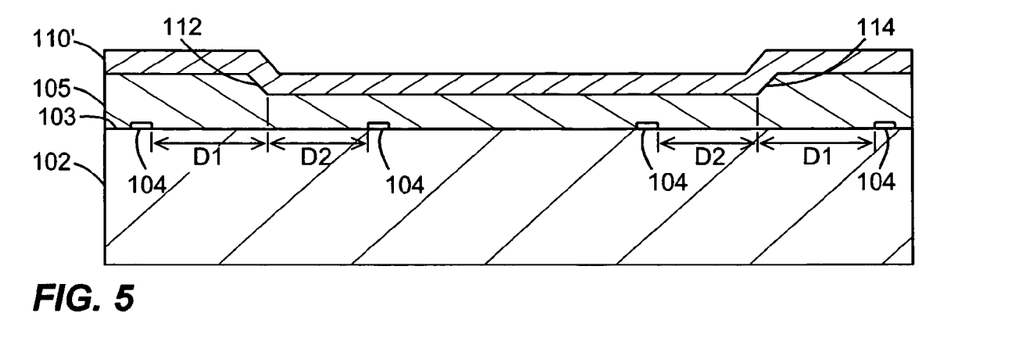
FIGS. 5–8 illustrate a first exemplary method of forming an optical backplane according to the present invention.

FIGS. 5–8 illustrate a first exemplary method of fabricating an optical backplane according to the present invention. Referring to FIG. 5, alignment marks 104 are formed on the top surface 103 of substrate 102. Alignment marks 104 serve to align the placement of focusing elements 124 to the end of core bodies 110 during the fabrication process, and to align the placement of receptacles 130 to focusing elements 124 during the assembly of the receptacles 130. Alignment marks 104 may comprise opaque material or etchings into the substrate's top surface 103, and are defined by a photolithographic mask in any conventional way. The alignment mark 104 can be made on lower cladding layer 105 (as indicated above) rather than on substrate 102.

Next, a lower cladding layer 105 is formed over the top surface 103 of substrate 102, and a groove with 45° angled ends is formed therein. The groove may be formed by a number of ways. As one way, the material for the lower cladding layer may comprise a photosensitive polymeric material (positive-tone) that can be exposed to actinic radiation and thereafter developed. In this case, the lower cladding layer may be exposed to patterned actinic radiation through a photolithographic mask to define a groove therein, with angled ends. The exposed layer may then be developed to remove the material within the groove. The angled ends may be defined using a grayscale mask, which has a gradation of opacity in the area of each 45° angled end. The design of grayscale masks is well-known to the art, and it is within the ordinary skill of a person in the art to design a grayscale mask to achieve the angled ends for a given material of layer 105 without undue experimentation. As another approach, the groove may be initially defined in layer 105 with square ends using a photolithographic mask, and then angled-laser ablation through a suitable set of ablation masks may be used to cut material from layer 105 to form the angled ends. This approach enables the use of a glass plate to serve as both substrate 102 and lower cladding layer 105, where the glass plate is etched through a patterned layer of photoresist.

In both of the above approaches, the photolithographic masks and the ablation masks are designed to have alignment marks corresponding to one or more locations of alignment marks 104 so that the process operator can align each mask to substrate 102 in a predetermined relationship. In addition, each mask is designed so that the angled ends are produced at predetermined distances from the alignment marks 104, shown as distances D1 and D2 in FIG. 5.

Next, still referring to FIG. 5, a layer 110' of core material is formed over the pattern-defined lower cladding layer 105. As an option, each of the angled ends may be coated with a reflective material, such as gold or tungsten (for glass cladding layers), prior to forming layer 110'. If cladding layer 105 comprises a polymeric material, it may be partially to fully cured prior to forming the reflective material in order to maintain the dimensional integrity of the angled ends during the formation process for the reflective material. If there is a sufficient difference between the indices of refraction of layers 105 and 110', as determined by Snell's law, total internal reflection will occur at the angled ends, and a coating of reflective material will not be needed.

Figure 6:
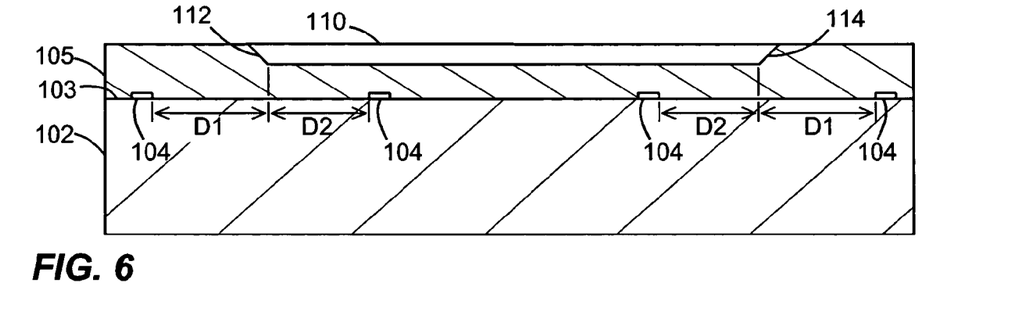

The layer 110' of core material may thereafter be pattern-etched to define the core bodies 110. This generally involves removing all the core material except the portions within the previously-formed grooves. The resulting structure is shown in FIG. 6. Layer 110' may comprise a positive-tone, photosensitive polymeric material. In this case, the portions of layer 110' to be removed can be exposed to actinic radiation through a photolithographic mask (that has alignment marks corresponding to one or more of the locations of alignment marks 104), and thereafter removed by exposure to a developing solution. If a binary photolithographic mask is used, there may be excess portions of layer 110' remaining over the angled ends and top sides of the core bodies 110. The excess portions can be minimized by foreshortening the dimensions of the patterns in the binary mask and overexposing the layer to the developer. The excess portions can also be minimized or avoided by using a grayscale mask where gradations of opacity are located over the angled ends and top sides of the core bodies 110.

Figure 7:
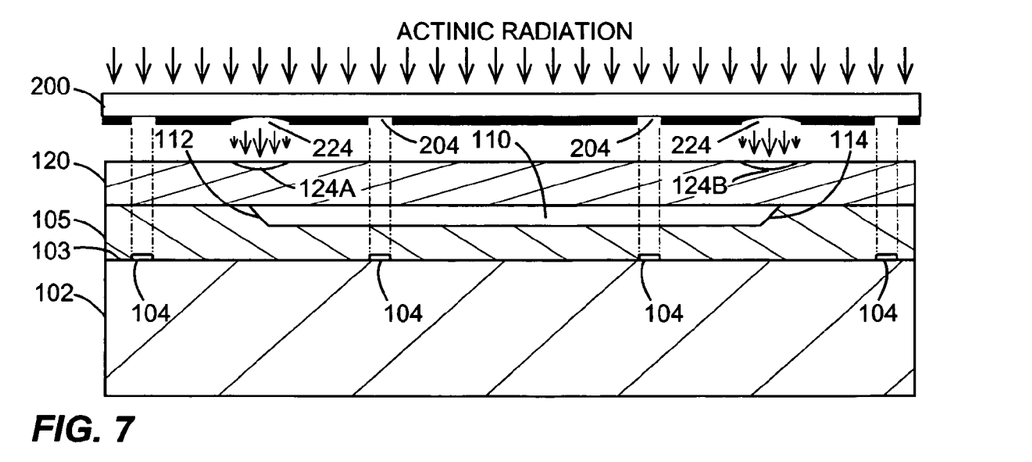

Next, as illustrated in FIG. 7, a photorefractive material layer 120 is formed over the lower cladding layer 105 and the core body 110. Photorefractive material 120 has an initial refractive index that can be changed (typically increased) to another value by exposure to actinic radiation, such as ultraviolet light. The material so exposed is a modified form of the photorefractive material having a refractive index that is different than the initial value, but having a similar chemical makeup of atoms, and typically sharing long-chain polymer molecules with the adjacent unexposed portions. Photorefractive material layer 120 is thereafter exposed to patterned actinic radiation through a grayscale mask 200, as illustrated in FIG. 7. Grayscale mask 200 defines an aperture 224 for each lens of focusing element 124, and is designed to vary the amount of actinic radiation that passes through aperture 224 as one moves from the perimeter of the aperture to the center of the aperture. In the case that the refractive index of photorefractive material 120 increases with exposure to actinic radiation, which is the typical case, grayscale mask 200 is designed to allow more actinic radiation to pass through at the center of the aperture than at the perimeter of the aperture. The greater amount of actinic radiation increases the depth to which the refractive index is changed in layer 120, and a plano-convex lens results, as shown in FIG. 7. Grayscale photolithographic mask 200 is designed to have alignment marks 204 corresponding to one or more locations of alignment marks 104 so that the process operator can align the mask to substrate 102 in a predetermined relationship, resulting in aperture 224 being disposed over a corresponding angled end 112, 114 of a core body 110.

In general, a polymerization process or densification takes place in the exposed region, and the degree and depth of the polymerization and/or densification varies with the amount of actinic radiation received. Manufacturers of photorefractive materials provide dosage charts which show the expected change in refractive index for given dosage levels. With this information, it is within the ordinary skill of a person in the art to design a grayscale mask to achieve the desired lens curvature and focusing properties. In addition, it is also within the skill of a person in the art to construct an array of test patterns in a grayscale mask, each pattern being slightly different, and to apply the grayscale mask to several test layers of photorefractive material to determine the resulting focal properties of each test pattern. The test pattern that provides a result closest to the desired focal properties may then be selected for use.

Figure 11:
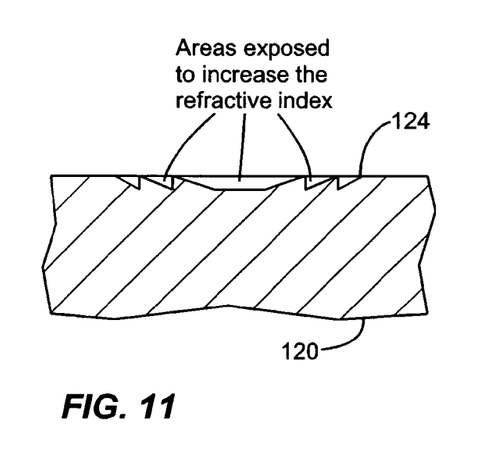
FIGS. 11 and 12 illustrate various grating structures that may be used in the focusing elements according to the present invention.
Figure 12:
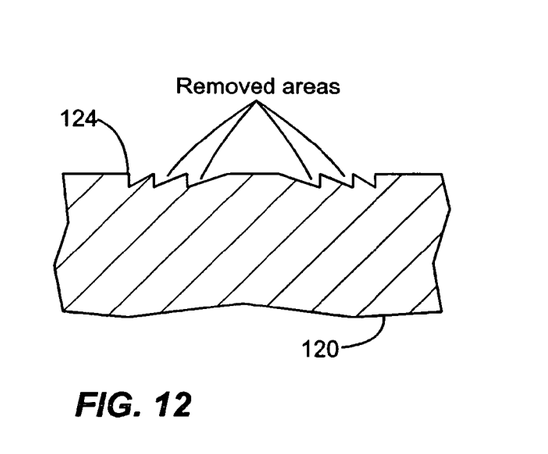

Instead of forming lenses for focusing elements 124 with a grayscale mask, one can form gratings having focusing properties with a correspondingly-designed grayscale mask. The grayscale mask can define a series of concentric rings in layer 120 that have a higher refractive index than the initial refractive index of layer 120, as shown in FIG. 11 (same drawing sheet as FIG. 3). Each ring has a tapered surface, with the center ring having a substantially trapezoidal shape, and the other rings having substantially triangular shapes. As another way of forming a grating, portions of material may be removed from the top surface 122 of layer 120, as shown in FIG. 12 (same drawing sheet as FIG. 3). In this case, layer 120 does not need to comprise a photorefractive material. Instead, it may comprise a positive-tone photosensitive material, which is pattern-exposed to a grayscale mask having an appropriate pattern, and thereafter exposed to a developer solution. Also, in this case, layer 120 may comprise a non-photosensitive material, and the grating pattern may be transferred to it by etching through a pattern-transfer mask.

Figure 8:
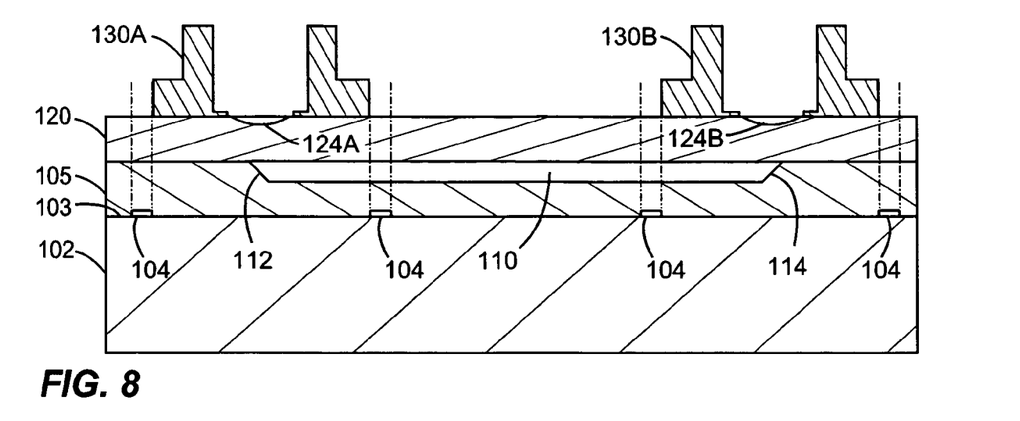

Next, as illustrated in FIG. 8, prefabricated receptacles 130 are mounted onto the optical backplane by a conventional assembly process. However, during the conventional assembly process, receptacles 130 are aligned to alignment marks 104, which are visible through the layers 105 and 120. The alignment marks 104 may be initially positioned such that receptacles 130 may be aligned to the marks at their corners (see FIG. 3). In a typical assembly process, an adhesive is applied to the bottom surface of each receptacle 130 prior to assembly, and a human operator places the receptacle onto the top surface of material layer 120 and aligns the corners to alignment marks 104. The human operator preferably looks through a microscope during this process, with the microscope preferably having a dual-view capability (which enables the operator to look simultaneously at two corners). In place of a human operator, an automated assembling machine may be used. In this case, the assembling machine has computer vision recognition capabilities, and the alignment marks 104 can be designed for optimal recognition by the assembling machine. Once the adhesive has set, the receptacle may be further secured to the optical backplane by other fasteners, such as screws, clips, etc.

Figure 9:
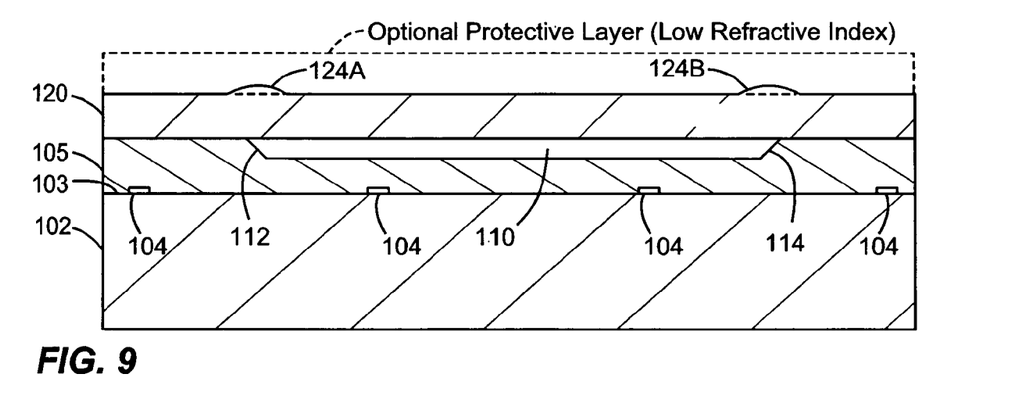
FIG. 9, in conjunction with FIGS. 5, 6 and 8 and the description thereof, illustrates a second exemplary method of forming an optical backplane according to the present invention.
Figure 10:
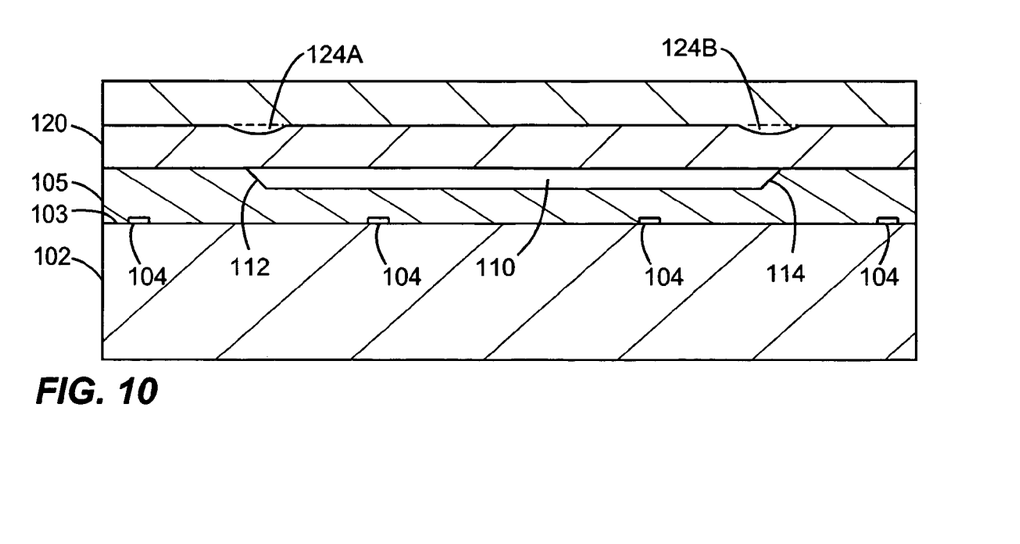
FIG. 10, in conjunction with FIGS. 5, 6 and 8 and the description thereof, illustrates a third exemplary method of forming an optical backplane according to the present invention.

In the above exemplary method, the lenses of the focusing elements 120 were formed by pattern exposure of photorefractive material. The lenses may be formed by other steps as well. For example, material layer 120 may comprise a positive-tone photosensitive material, which can then be patterned to form a lens structure by exposure to actinic radiation through a grayscale photolithographic mask, followed by exposure to a developer solution to remove the material previously exposed to actinic radiation. The lens structure can comprise a convex bump of material, as shown in FIG. 9; or can comprise a convex depression in material layer 120, which is subsequently filled with material having a higher refractive index than that of material layer 120, as shown in FIG. 10. In the former case (FIG. 9), a layer of material having a refractive index lower than that of layer 120 may be formed over layer 120 in order to protect the convex bumps.) In each approach, the grayscale photolithographic mask is designed to have alignment marks (like marks 204) corresponding to one or more locations of alignment marks 104 on the substrate so that the process operator can align the mask to substrate 102 in a predetermined relationship, resulting in the definition aperture for the lens being disposed over a corresponding angled end 112, 114 of a core body 110. The above structures may also be achieved by construction methods using a non-photosensitive material for layer 120. In these methods, after material layer 120 is formed, a photo-sensitive pattern-transfer layer is formed over layer 120. The pattern-transfer layer is patterned with the aforementioned grayscale mask to define the lens structures. Thereafter, material layer 120 and the pattern-transfer layer are exposed to an anisotropic etching process that etches both layers. The anisotropic etching process causes the pattern in the pattern-transfer layer to be transferred to material layer 120.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An optical backplane comprising:
   a substrate having a top surface and a bottom surface;
   a lower cladding layer disposed over the top surface of the substrate;
   a first core body having a first end and a second end, at least a portion of the first core body being in contact with the lower cladding layer;
   a material layer disposed above the lower cladding layer and the first end of the first core body, the material layer having a top surface and a bottom surface;
   a focusing element formed at the top surface of the material layer, the focusing element being located above the first end of the first core body; and
   a receptacle disposed above the material layer and having a slot to receive a ribbon fiber connector, the receptacle being disposed such that its slot is located above the focusing element.

2. The optical backplane of claim 1 wherein the focusing element comprises a lens.

3. The optical backplane of claim 2 wherein the material layer comprises a photorefractive material having an initial refractive index, and wherein the lens comprises a modified form of the photorefractive material having a refractive index that is greater than the initial refractive index.

4. The optical backplane of claim 2 wherein the material layer has a first refractive index and a recess formed at its top surface in the location of the lens, and wherein the lens is disposed in the recess and comprises a material that has a second refractive index that is different from the first refractive index.

5. The optical backplane of claim 2 wherein the lens comprises a bump on the top surface of the material layer.

6. The optical backplane of claim 5 wherein the lens comprises a material having a first refractive index, and wherein the optical backplane further comprises a cover layer disposed over the bump and at least a portion of the material layer, the cover layer having a second refractive index that is less than the first refractive index.

7. The optical backplane of claim 2 wherein the lens comprises a depression in the top surface of the material layer.

8. The optical backplane of claim 7 wherein the material layer has a first refractive index, and wherein the optical backplane further comprises a cover layer disposed over the depression and at least a portion of the material layer, the cover layer having a second refractive index that is greater than the first refractive index.

9. The optical backplane of claim 1 wherein the focusing element comprises a grating.

10. The optical backplane of claim 9 wherein the material layer comprises a photorefractive material having an initial refractive index, and wherein the grating comprises a plurality of concentric rings disposed at the top surface of the material layer, each concentric ring comprising a modified form of the photorefractive material having a refractive index that is greater than the initial refractive index.

11. The optical backplane of claim 9 wherein the grating comprises a plurality of concentric rings of material removed from the top surface of the material layer.

12. The optical backplane of claim 1, wherein the slot has a width, and wherein the focusing element has a diameter that is equal to or less than 250 μm.

13. The optical backplane of claim 1 further comprising an alignment mark to facilitate the alignment of the receptacle, the alignment mark being disposed on the substrate, the material layer, a layer above the material layer, or a layer between the substrate and the material layer, and wherein the alignment mark is at a predetermined distance from the first end of the core body.

14. The optical backplane claim 1 further comprising an angle-reflecting structure disposed at the first end of the core body.

15. A method of forming an integrated optical backplane, the method comprising the steps of:
  (a) forming at least a first waveguide layer, the first waveguide layer having at least a first cladding layer and at least a first core body, the first core body having a first end, a second end, and at least a portion in contact with the first cladding layer;
  (b) forming a material layer above the first waveguide layer, the material layer having a top surface and a bottom surface, with the bottom surface facing the first waveguide layer, the material layer comprising a photorefractive material adapted to be converted to a modified form by exposure to actinic radiation; and
  (c) forming a focusing element at the top surface of the material layer, the focusing element being located above the first end of the first core body, said step comprising exposing the material layer to a pattern of actinic radiation passed through a grayscale mask such that a spatial variation in the refractive index occurs in a region of the material layer located above the first end of the first core body, with the region comprising modified and unmodified forms of the photorefractive material.

16. The method of claim 15 wherein the spatial variation comprises the form of a plano-convex lens.

17. The method of claim 15 wherein the spatial variation comprises the form of a grating.

18. The method of claim 17 wherein the spatial variation comprises a plurality of concentric rings.

19. The method of claim 15 wherein step (c) comprises removing portions of the material layer to define a bump having a convex form.

20. The method of claim 19 wherein the material layer has a first refractive index, and wherein step (c) further comprises the step of forming a cover layer over the bump and at least a portion of the material layer, the cover layer having a second refractive index that is less than the first refractive index.

21. The method of claim 15 wherein the material layer has a first refractive index, and wherein step (c) comprises:
  forming a recess in the material layer at its top surface, the recess being located above the first end of the first core body; and
  filling the recess with material having a second refractive index different from the first refractive index.

22. The method of claim 21 wherein the second refractive index is greater than the first refractive index.

23. The method of claim 15 wherein step (c) comprises removing portions of the material layer to define a grating.

24. The method of claim 15 wherein step (c) comprises removing portions of the material layer to define a plurality of concentric rings.

25. The method of claim 15 further comprising the steps of:
  forming an alignment mark on the top surface of the material layer; and
  mounting a receptacle on the top surface of the material layer, the receptacle constructed to receive a connector having an optical fiber, the mounting step including the step of aligning a feature of the receptacle to the alignment mark.

26. The method of claim 15 further comprising the steps of:
  forming an alignment mark on the substrate or a layer below the material layer, the alignment mark being formed prior to the formation of the material layer; and
  mounting a receptacle on the top surface of the material layer, the receptacle constructed to receive a connector having an optical fiber, the mounting step including the step of aligning a feature of the receptacle to the alignment mark.

27. A method of forming an integrated optical backplane, the method comprising the steps of:
  (a) forming at least a first waveguide layer, the first waveguide layer having at least a first cladding layer and at least a first core body, the first core body having a first end, a second end, and at least a portion in contact with the first cladding layer;
  (b) forming a material layer above the first waveguide layer, the material layer having a top surface and a bottom surface, with the bottom surface facing the first waveguide layer;
  (c) forming a focusing element at the top surface of the material layer, the focusing element being located above the first end of the first core body;
  (d) forming an alignment mark on the top surface of the material layer; and
  (e) mounting a receptacle on the top surface of the material layer, the receptacle constructed to receive a connector having an optical fiber, the mounting step including the step of aligning a feature of the receptacle to the alignment mark.

28. The method of claim 27 wherein step (d) is done prior to step (b) such that the alignment mark is formed prior to the formation of the material layer.

29. A method of forming an integrated optical backplane, the method comprising the steps of:
  (a) forming at least a first waveguide layer, the first waveguide layer having at least a first cladding layer and at least a first core body, the first core body having a first end, a second end, and at least a portion in contact with the first cladding layer;
  (b) forming a material layer above the first waveguide layer, the material layer having a top surface and a bottom surface, with the bottom surface facing the first waveguide layer; and
  (c) forming a focusing element at the top surface of the material layer, the focusing element being located above the first end of the first core body, said step comprising removing portions of the material layer to define a bump having a convex form.

30. A method of forming an integrated optical backplane, the method comprising the steps of:
  (a) forming at least a first waveguide layer, the first waveguide layer having at least a first cladding layer and at least a first core body, the first core body having a first end, a second end, and at least a portion in contact with the first cladding layer;
  (b) forming a material layer above the first waveguide layer, the material layer having a first refractive index, a top surface, and a bottom surface, with the bottom surface facing the first waveguide layer; and (c) forming a focusing element at the top surface of the material layer, the focusing element being located above the first end of the first core body, said step comprising forming a recess in the material layer at its top surface, the recess being located above the first end of the first core body, and filling the recess with material having a second refractive index different from the first refractive index.

31. A method of forming an integrated optical backplane, the method comprising the steps of:
(a) forming at least a first waveguide layer, the first waveguide layer having at least a first cladding layer and at least a first core body, the first core body having a first end, a second end, and at least a portion in contact with the first cladding layer;
(b) forming a material layer above the first waveguide layer, the material layer having a top surface and a bottom surface, with the bottom surface facing the first waveguide layer; and
(c) forming a focusing element at the top surface of the material layer, the focusing element being located above the first end of the first core body and separated from the core body, said step comprising removing portions of the material layer to define a grating.

32. An optical backplane comprising:
a substrate having a top surface and a bottom surface;
a lower cladding layer disposed over the top surface of the substrate;
a first core body having a first end and a second end, at least a portion of the first core body being in contact with the lower cladding layer;
a material layer disposed above the lower cladding layer and the first end of the first core body, the material layer having a top surface and a bottom surface, and comprising a photorefractive material having an initial refractive index;
a focusing element formed at the top surface of the material layer, the focusing element being located above the first end of the first core body and having a lens, the lens comprising a modified form of the photorefractive material having a refractive index that is greater than the initial refractive index, the lens having a plano-concave shape or a plano-convex shape.

33. An optical backplane comprising:
a substrate having a top surface and a bottom surface;
a lower cladding layer disposed over the top surface of the substrate;
a first core body having a first end and a second end, at least a portion of the first core body being in contact with the lower cladding layer;
a material layer disposed above the lower cladding layer and the first end of the first core body, the material layer having a top surface, a bottom surface, a first refractive index, and a recess formed at its top surface in a location above the first end of the first core body; and
a focusing element formed at the top surface of the material layer and located above the first end of the first core body to couple light to or from the first end of the first core body, the focusing element comprising a lens disposed in the recess of the material layer, the lens comprising a material that has a second refractive index that is different from the first refractive index.

34. An optical backplane comprising:
a substrate having a top surface and a bottom surface;
a lower cladding layer disposed over the top surface of the substrate;
a first core body having a first end and a second end, at least a portion of the first core body being in contact with the lower cladding layer;
a material layer disposed above the lower cladding layer and the first end of the first core body, the material layer having a top surface and a bottom surface; and
a focusing element formed at the top surface of the material layer, the focusing element being located above the first end of the first core body to couple light to or from the first end of the first core body, the focusing element comprising a lens, the lens comprising a depression in the top surface of the material layer.

35. The optical backplane of claim 34 wherein the material layer has a first refractive index, and wherein the optical backplane further comprises a cover layer disposed over the depression and at least a portion of the material layer, the cover layer having a second refractive index that is greater than the first refractive index.

36. An optical backplane comprising:
a substrate having a top surface and a bottom surface;
a lower cladding layer disposed over the top surface of the substrate;
a first core body having a first end and a second end, at least a portion of the first core body being in contact with the lower cladding layer;
a material layer disposed above the lower cladding layer and the first end of the first core body, the material layer having a top surface and a bottom surface; and comprising a photorefractive material having an initial refractive index; and
a focusing element formed at the top surface of the material layer, the focusing element being located above the first end of the first core body to couple light to or from the first end of the first core body, the focusing element comprising a grating, the grating comprising a plurality of concentric rings disposed at the top surface of the material layer, each concentric ring comprising a modified form of the photorefractive material having a refractive index that is greater than the initial refractive index.

37. An optical backplane comprising:
a substrate having a top surface and a bottom surface;
a lower cladding layer disposed over the top surface of the substrate;
a first core body having a first end and a second end, at least a portion of the first core body being in contact with the lower cladding layer;
a material layer disposed above the lower cladding layer and the first end of the first core body, the material layer having a top surface; and
a focusing element formed at the top surface of the material layer, the focusing element being located above the first end of the first core body to couple light to or from the first end of the first core body, the focusing element comprising a grating, the grating comprising a plurality of concentric rings disposed at the top surface of the material layer.

* * * * *